United States Patent [19]
Yang

[11] Patent Number: 5,507,198
[45] Date of Patent: Apr. 16, 1996

[54] SIMPLE LOW-COST MECHANICAL TRANSMISSION FOR ACCOMMODATING VARIABLE LOADS

[76] Inventor: Tai-Her Yang, 5-1 Taipin St., Si-Hu Town, Dzan-Hwa, Taiwan

[21] Appl. No.: 236,445

[22] Filed: May 2, 1994

Related U.S. Application Data

[63] Continuation-in-part of Ser. No. 870,255, Apr. 17, 1992, abandoned, which is a continuation-in-part of Ser. No. 749,130, Aug. 23, 1991, abandoned.

[51] Int. Cl.⁶ .............................. F16D 47/00; F16H 3/08
[52] U.S. Cl. ................. 74/368; 74/337; 74/356; 192/48.3; 192/48.9
[58] Field of Search .................... 74/337, 412 TA, 74/356, 368; 192/48.3, 48.9, 48.92

[56] References Cited

U.S. PATENT DOCUMENTS

| | | | |
|---|---|---|---|
| 942,913 | 12/1909 | Keller | 74/337 |
| 1,877,383 | 9/1932 | Blackstock | 74/337 |
| 1,983,250 | 12/1934 | Tibbetts | 192/48.3 |
| 1,983,827 | 12/1934 | Winther et al. | 192/48.3 |
| 2,143,325 | 1/1939 | Kreis | 74/368 |
| 2,156,698 | 5/1939 | Martin | 74/337 |
| 2,172,780 | 9/1939 | Whitney et al. | 192/48.3 |
| 2,187,835 | 1/1940 | Martin | 74/337 |
| 2,246,996 | 6/1941 | Kreis | 74/368 |
| 2,482,460 | 9/1949 | Browne | 192/48.3 |
| 2,600,269 | 6/1952 | Saives | 74/337 |
| 2,725,758 | 12/1955 | Dickey | 74/359 |
| 2,760,379 | 8/1956 | Grunbaum | 74/337 |
| 3,006,209 | 10/1961 | Stromberg | 192/48.9 |
| 3,059,493 | 10/1962 | Wolfram | 74/368 |
| 3,110,192 | 11/1963 | Hood | 74/368 |
| 3,444,748 | 5/1969 | Sutaruk | 192/48.3 |
| 3,524,526 | 8/1970 | Denkowski | 192/48.9 |
| 4,353,263 | 10/1982 | Ciciora | 74/337 |
| 4,946,016 | 8/1990 | Torres | 192/48.2 |

FOREIGN PATENT DOCUMENTS 608822  3/1946  United Kingdom ..................... 74/368

*Primary Examiner*—Charles A. Marmor
*Assistant Examiner*—Troy Grabow
*Attorney, Agent, or Firm*—Leonard Bloom

[57] ABSTRACT

A mechanical transmission (10) includes a first gear (13), a second gear (15), a slip clutch (14), an input shaft (11), a fourth gear (20), a one-way bearing (21), a third gear (18) and an output shaft (12). The first gear (13) and the slip clutch (14) are mounted on the input shaft (11). The first gear (13) is meshed with the second gear (15) which is mounted on the output shaft (12). The one-way bearing (21) and the fourth gear (20) are mounted on the output shaft (12); the latter (20) is meshed with the third gear (18) which is mounted on the input shaft (11) to constitute a step-down gearing (22). When the load upon the output shaft (12) increases so that the torque imposed upon the slip clutch (14) is higher than predetermined, the slip clutch (14) releases, and the increased torque generated by the step-down gear set (18, 20) drives the increased load upon the output shaft (12). Two additional embodiments (10', 10") are disclosed.

3 Claims, 2 Drawing Sheets

SIMPLE LOW-COST MECHANICAL TRANSMISSION FOR ACCOMMODATING VARIABLE LOADS

CROSS-REFERENCE TO RELATED APPLICATION

This application is a continuation-in-part of application Ser. No. 07/870,255 filed Apr. 17, 1992 (abandoned) which, in turn, is a continuation-in-part of application Ser. No. 749,130 filed Aug. 23, 1991, (abandoned) the disclosures of which are incorporated herein in their entirety.

BACKGROUND OF THE INVENTION

Mechanical transmissions for accommodating variable loads imposed upon an output shaft are well known. However, the existing transmissions are cumbersome, complicated and expensive; and it would be desirable to provide a simple low-cost transmission useful in a variety of products and mechanical systems.

SUMMARY OF THE INVENTION

Accordingly, it is an object of the present invention to alleviate the disadvantages and deficiencies of the prior art by providing a simple low-cost transmission useful in a variety of products and mechanical systems.

In accordance with the teachings of the present invention, a transmission is herein disclosed, including a driving input shaft and a driven output shaft. A first gear is loosely mounted upon the driving input shaft and is coupled thereto by a slip clutch having a predetermined torque release. A second gear is carried by the driven output shaft, is keyed thereto for rotation in unison, and meshes with the first gear. The first gear is larger than the second gear, thereby providing a first step-up gearing having a rotational speed increase. A third gear is carried by the driving input shaft and is keyed thereto for rotation in unison; and a fourth gear is loosely mounted on the driven output shaft, is coupled thereto through a one-way bearing, and meshes with the third gear. The third gear is smaller than the fourth gear, thereby providing a second step-down gearing having a rotational speed reduction. As a result, at a relatively-light load imposed upon the driven output shaft, the slip clutch does not slip; and the drive is through the first step-up gearing while the third and fourth gears of the second step-down gearing are idling. Moreover, at a relatively-heavy load imposed upon the driven output shaft, the slip clutch releases; and the drive is through the third and fourth gears and the one-way bearing of the second-step down gearing for reduced speed of rotation of the driven output shaft. As a result, an increased torque is imparted on the driven output shaft to meet the demands of the relatively-heavy load.

These and other objects of the present invention will become apparent from a reading of the following specification taken in conjunction with the enclosed drawings.

GENERAL DESCRIPTION OF THE PREFERRED EMBODIMENT

Figure 1:
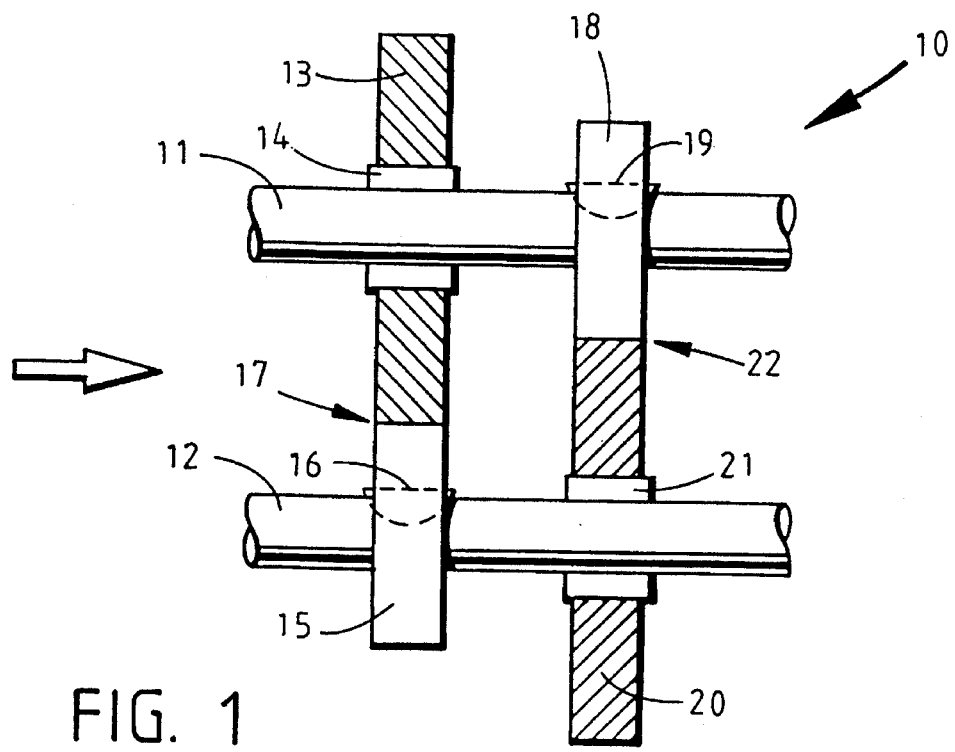
FIG. 1 is a schematic plan layout of the improved transmission of the present invention.
Figure 2:
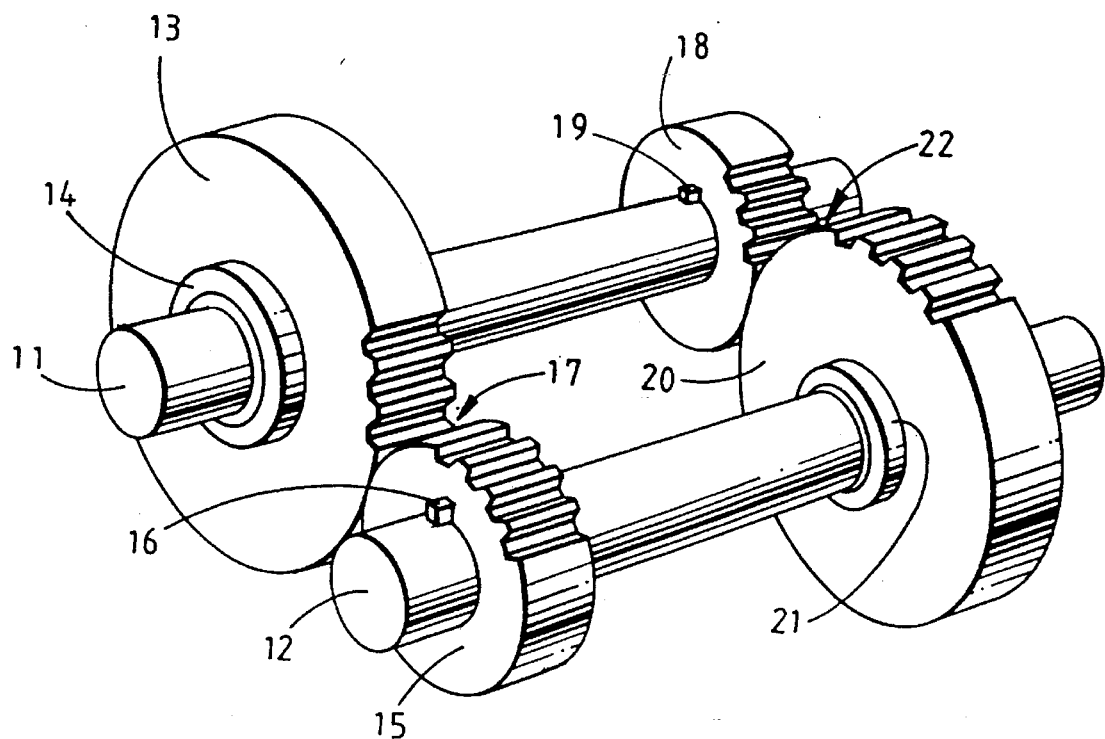
FIG. 2 is a perspective view thereof

With reference to FIGS. 1 and 2, the transmission 10 includes a driving input shaft 11 and a driven output shaft 12. Preferably, shafts 11 and 12 are parallel; however, it will be appreciated by those skilled in the art that the shafts 11 and 12 may have other configurations consonant with the teachings of the present invention.

With this in mind, the driving input shaft 11 carries a first gear 13, loosely mounted thereon, and coupled thereto by a slip clutch 14. The slip clutch 14 has a predetermined torque release depending upon the load (not shown) imposed upon the driven output shaft 12. A second gear 15 is carried by the driven output shaft 12 and is keyed thereto, as at 16, for rotation in unison. The first gear 13 is larger than the second gear 15, thereby providing a first step-up gearing 17. This first step-up gearing 17, which comprises the combination of the first gear 13 and the second gear 15, has a rotational speed increase (or increased rpm). A third gear 18 is carried by the driving input shaft 11 and is keyed thereto, as at 19, for rotation in unison. A fourth gear 20 is coupled to the driven output shaft 12 through a one-way bearing 21, and meshes with the third gear 18. This third gear 18 is smaller than the fourth gear 20, thereby providing a second step-down gearing 22. This second step-down gearing 22, which comprises the third gear 18 and the fourth gear 20, has a rotational speed decrease (or decreased rpm) between the input shaft 11 and the output shaft 12.

In operation, at a relatively-light load imposed upon the driven output shaft 12, the slip clutch 14 does not slip, and the drive is through the first gear 13 to the second gear 15. The third gear 18 and fourth gear 20 are idling (running under no load) due to the one-way bearing 21. However, at a relatively-heavy load imposed upon the driven output shaft 12, the slip clutch 14 transforms the synchronous coupling between the first gear 13 and the input shaft 11 into a slip relationship, that is, the slip clutch 14 releases at a predetermined torque; the drive from the first gear 13 to the second gear 15 is interrupted; and the drive is through the gear 18 and the fourth gear 20. As a result, the speed (rpm) is reduced on the driven output shaft 12, but, concurrently, the torque on the driven output shaft 12 is increased to meet the increased load imposed upon the driven output shaft 12.

Figure 3:
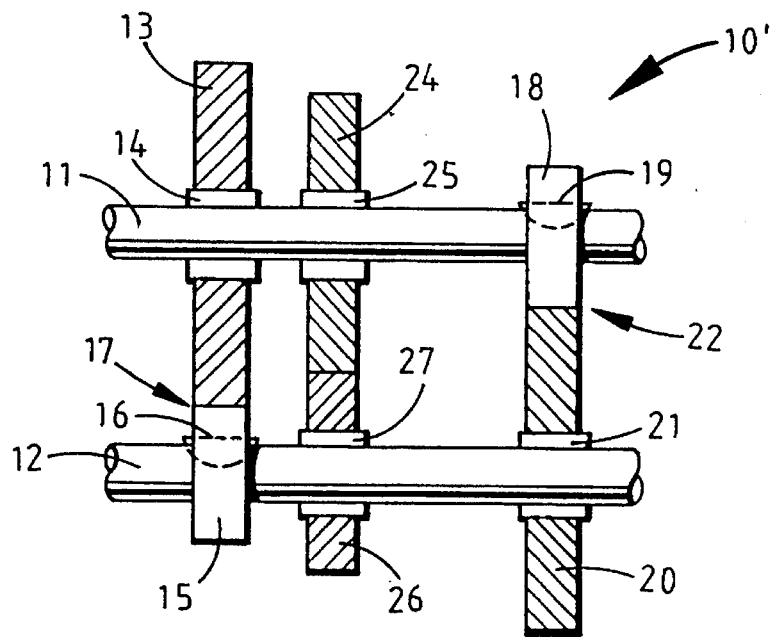
FIG. 3 is a first alternate embodiment thereof.

With reference to FIG. 3, a middle-ratio gear set 24 and 26 is added to embody the multi-step function. The gear 24 is coupled to the driving input shaft 11 by a second slip clutch 25. The gear 24 meshes with the gear 26 coupled to the driven output shaft 12 by a second one-way bearing 27. The rating torque of the slip clutch 25, transforming the synchronous coupling into slipping, is larger than that of the slip clutch 14.

Figure 4:
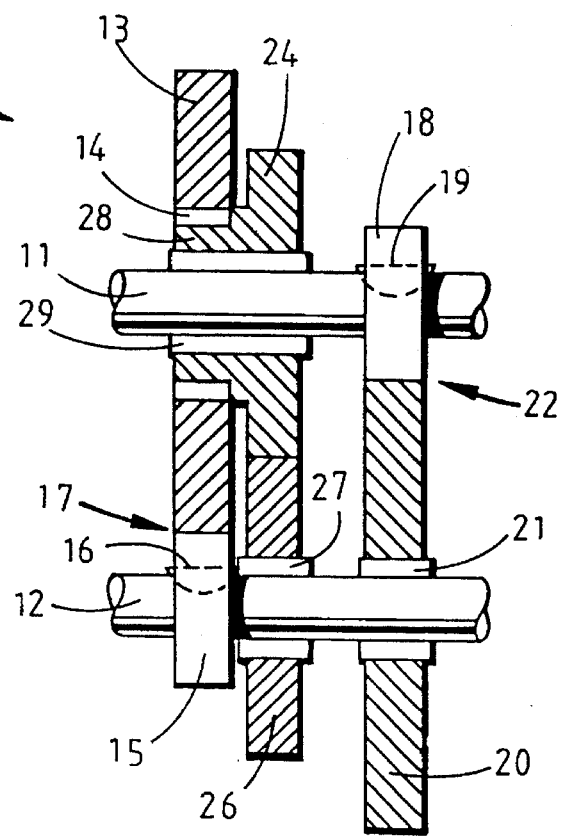
FIG. 4 is a second alternate embodiment thereof.

With reference to FIG. 4, the first slip clutch 14 is between the first gear 13 and the hub 28 of the fifth gear 24; and a combined slip clutch 29 is between the fifth gear 24 (and its hub 28) and the driving input shaft 11. When the loading torque gets increased, the slip clutch 14, at some point, initiates the slipping when the loading torque continues to increase the slip clutch 29 does the slipping then.

Obviously, many modifications may be made without departing from the basic spirit of the present invention. For example, in lieu of the gears (13, 15, etc.) pulleys or sheaves (not shown) may be used. Also, any type of torsion coupling device may be used in lieu of the slip clutches (14, 25, 28) if desired. Accordingly, it will be appreciated by those skilled in the art that within the scope of the appended claims, the invention may be practiced other than has been specifically described herein.

I claim:

1. In a transmission, the combination of a driving input shaft, a driven output shaft, a first gear loosely mounted upon the driving input shaft and coupled thereto by a slip clutch having a predetermined torque release, a second gear carried by the driven output shaft, keyed thereto for rotation in unison, and meshing with the first gear, the first gear being larger than the second gear, thereby providing a first step-up gearing having a rotational speed increase, a third gear carried by the driving input shaft and keyed thereto for rotation in unison, and a fourth gear loosely mounted on the driven output shaft, coupled thereto through a one-way bearing, and meshing with the third gear, the third gear being smaller than the fourth gear, thereby providing a step-down gearing having a rotational speed reduction; such that at a relatively-light load imposed upon the driven output shaft, the slip clutch does not slip, and the drive is through the first step-up gearing while the third and fourth gears of the step-down gearing are idling; and such that at a relatively-heavy load imposed upon the driven output shaft, the slip clutch automatically releases at a predetermined torque, and the drive is through the third and fourth gears and the one-way bearing of the step-down gearing for reduced speed of rotation of the driven output shaft, and thereby providing increased torque for the driven output shaft to meet the demands of the relatively-heavy load.

2. The combination of claim 1, further including a second step-up gearing between first step-up gearing and the step-down gearing, the second step-up gearing including a fifth gear coupled to the driving input shaft by a second slip clutch, and a sixth gear carried by the driven output shaft, coupled thereto by a second one-way bearing, and meshing with the fifth gear.

3. The combination of claim 2, wherein the fifth gear has a hub, wherein the first slip clutch is between the first gear and the hub of the fifth gear, and wherein a combined slip clutch is provided between the driving input shaft and the fifth gear and the hub thereof.

* * * * *